Sept. 16, 1958     P. STRONG     2,852,297
COUPLING DEVICE
Filed Feb. 13, 1956
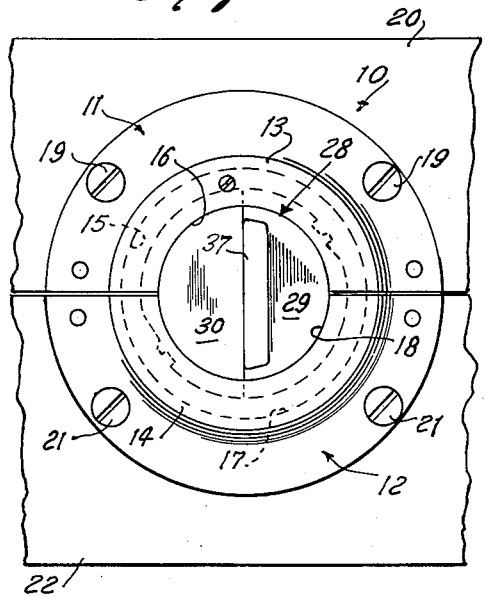
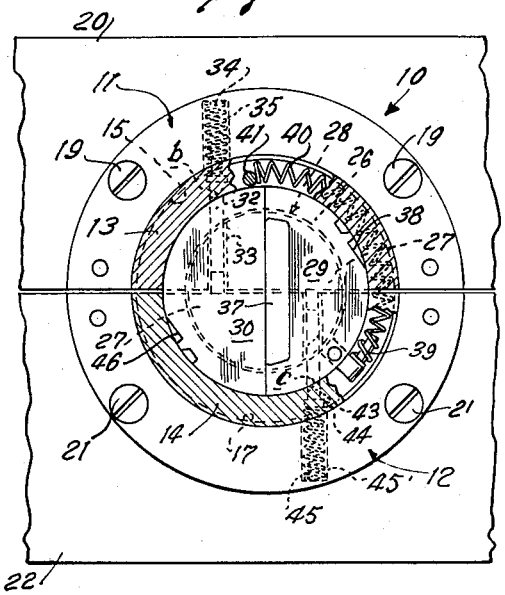
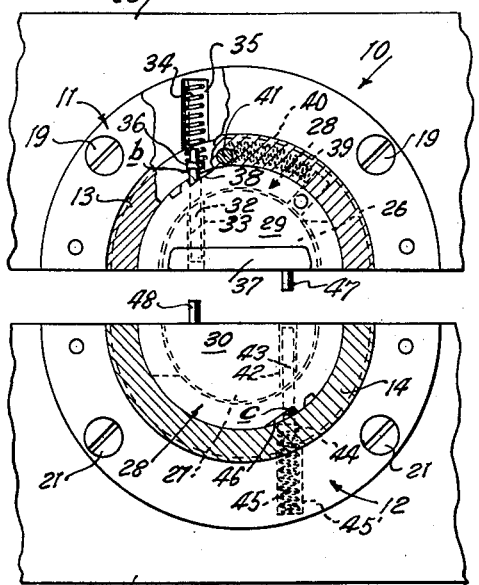
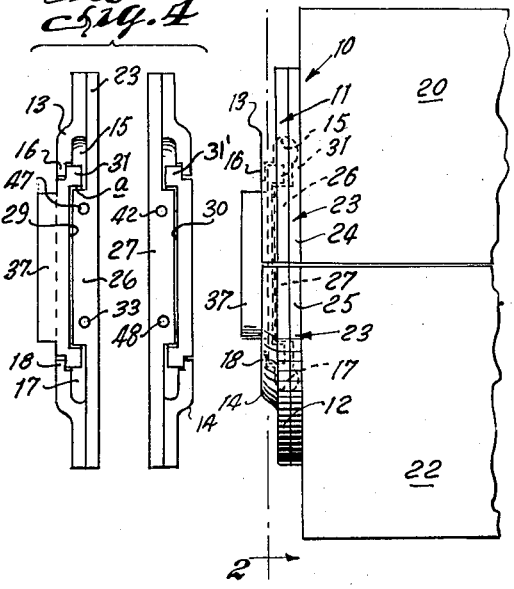
INVENTOR
PAUL STRONG.
BY
ATTORNEY United States Patent Office 2,852,297
Patented Sept. 16, 1958

2,852,297

COUPLING DEVICE

Paul Strong, Dallas, Tex.

Application February 13, 1956, Serial No. 565,041

4 Claims. (Cl. 292—333)

This invention relates to latches, fasteners and couplings and it has particular reference to an all purpose fastener for securing together relatively movable parts or objects.

The principal object of the invention is to provide a fastening device composed of a split housing defining complementary separable sections each formed with a semi-circular track-way to accommodate the semi-circular, complementary parts or sections of a core disc or interlocking member which is rotatable in the track-ways of the housing sections when the sections of both the housing and core are juxtaposed to form complete circles. When the contiguous edges of the core sections are at right angles to the contiguous edges of the housing sections it is not possible to separate the housing sections but when the core is rotated 90° to bring into parallelism the contiguous edges of the core with the contiguous edges of the housing, the sections of the latter can be separated.

Another object of the invention is to provide a fastener which is at once a latch and a coupling. The device has many adaptations including a latch for luggage, a latch for sliding doors, box lids and the like; a catch for necklaces, bracelets and similar uses as well as a safety belt fastener vehicle tow coupling or in any instance where two related parts are to be joined together quickly and as quickly released.

Still another object of the invention is to provide a fastener of the type specified in which the core sections can be manually moved to unlatched position and spring biased to latched position in the housing or both latching and unlatching operations may be performed manually, depending upon the use to which the invention is put.

Other objects and advantages will become manifest as the description proceeds when considered with the accompanying drawing wherein:

Fig. 1 is a front elevational view of a fastener constructed according to the invention.

Fig. 2 is a sectional view taken on line 2—2 of Fig. 5.

Fig. 3 is a view similar to Fig. 2 but showing the fastener sections separated.

Fig. 4 is a view showing the confronting faces of complementary fastener sections.

Fig. 5 is a side elevational view of the assembly as it is shown in Fig. 1.

As the following detailed description of the drawing proceeds, it will become apparent that the invention is revealed in but one of many other possible forms without change in principle, that is, a housing in separable sections in which a circular track-way is formed when the sections are in juxtaposition and a core in separable sections rotatable in the track-way of the housing and positionable in one position to secure the housing sections together and in another position, to permit the housing sections to separate.

In the drawing, reference numeral 10 denotes generally the complete fastener or coupling embodying the invention. The device consists of two complementary housing sections 11 and 12 which may be circular, as shown, square or of any other geometrical shape. In the form of the invention shown, a circular boss is formed with part 13 on the housing section 11 and part 14 on the companion section 12, thus making the boss continuous when the two sections 11 and 12 are in contiguous relationship, as shown in Figs. 1 and 2.

The boss part 13 has an undercut 15 defining a semi-circular flange 16 while a corresponding undercut 17 defines a semi-circular flange 18 on the part 14 of the boss. Therefore, when the two housing sections 11 and 12 are in juxtaposition, as shown in Figs. 1 and 2, the undercuts 15 and 17 and flanges 16 and 18 become circular and provide jointly a continuous track-way within the confines of the boss.

The housing section 11 is adapted to be secured, as by screws 19, to what may be a lid 20 of a trunk, chest or suitcase while the section 12 of the housing is secured, as by screws 21 to the trunk, chest or suitcase 22 so that when the lid 20 is closed, the housing sections 11 and 12 will form a circle as will likewise the track-way defined by the undercuts 15—17 and their flanges 16 and 18, respectively.

A base plate, generally indicated by reference numeral 23 (Figs. 4 and 5) is made in semi-circular sections 24 and 25 and made a part of or secured to the housing sections 11 and 12, respectively. Formed on the section 24 of the base plate 23 is a semi-circular boss 26 and formed on the section 25 of the base plate 23 is a semi-circular boss 27.

The foregoing description relates to the housing 10 and all of the described parts are stationary with their respective sections 11 and 12 of the housing. The mechanism by which the two housing sections are secured together will now be described.

A core or interlocking member is generally indicated by reference numeral 28 although it is made in semi-circular sections 29 and 30. The sections 29 and 30 have peripheral flanges 31 and 31', respectively (Figs. 4 and 5) whose inner surface *a* bears frictionally against the periphery of the boss carried by the base plate and underlies the flanges 16 and 18 of the boss on the housing 10 and composed of the sections or parts 13 and 14. In this manner, the core member 28 may be rotated in the track-way 15—17, when the two housing sections 11 and 12 are in juxtaposition (Figs. 1 and 2), except as controlled by latching means carried jointly by the housing sections and the core sections.

The latching means referred to above consists of a plunger 32 (Figs. 2 and 3) which reciprocates in a bore 33 extending through the section 27 of the boss formed on the base plate 23. A coil spring 34 is disposed in a bore 35 extending into the housing section 11, one end bearing against the inner end of the bore 35 while the opposite end of the spring bears against an annular shoulder 36 on the plunger 32, normally urging the plunger outwardly. The plunger 32 has an inclined shoulder *b* (Fig. 2) which frictionally engages the periphery of the core 28 as its sections 29 and 30 are rotated in unison by a handle 37, formed on the core section 29.

The core section 29 has a notch 38 cut in its periphery with which the detent or plunger 32 engages when the core section 29 is rotated to the position shown in Fig. 3 or the unlatching position thereof. The core section 29 has a projection 39 (Fig. 2) on its perimeter which is received in one end of a coil spring 40. The coil spring 40 is curved to lie in the track-way 15—17 of the housing sections 11 and 12 and its opposite end bears against a pin 41 in the track-way 15 of the housing section 11 (Figs. 2 and 3). It is evident therefore, that the core section 29 may rotate in the track-way 15—17 but is prevented from rotating by the plunger or detent 32 and the biasing action of its spring 34.

The semi-circular boss 27 has a bore 42 in which reciprocates a plunger or detent 43 having an annular shoulder 44 thereon against which bears one end of a coil spring 45, disposed in a bore 45 extending into the housing section 12. An inclined shoulder *c* formed on the plunger 43 rides on the periphery of the core section 30 when the core is rotated to the unlatching position shown in Fig. 3. However, when such position is reached, the shoulder *c* drops into a notch 46 in the periphery of the core section 30, holding it in the position shown in Fig. 3.

When the fastener sections are apart as shown in Fig. 3, the core sections 29 and 30 are held in their respective sections 11 and 12 of the housing 10 by their respective plungers 32 and 43. However, when one section of the fastener is brought into engagement with the complementary section thereof, a pin 47 (Fig. 3) rigid with the face of the semi-circular boss 27 on the base plate 23 enters the open end of the plunger bore 42 in the face of the adjacent semi-circular boss 26 and engages the end of the plunger 43 therein, urging the same outwardly against the resistance of its spring 45 and disengaging the shoulder *c* of the plunger 43 from its slot or notch 46. At the same time, a pin 48 carried by the companion semi-circular boss 26 enters the open end of the plunger bore 33 and engages the end of the plunger 32 therein, moving the same longitudinally against the resistance of its spring 34 and lifting the shoulder *b* of the plunger out of the notch 38 of the core section 29. Automatically, the core sections 29 and 30 are propelled by the coil spring 40 to the position shown in Figs. 1 and 5 or a position where the meeting surfaces of the core sections 29 and 30 are at right angles to the meeting surfaces of the housing sections 11 and 12. In this position of the fastener parts, the two housing sections cannot be separated.

To separate the two fastener sections 11 and 12, it is necessary only to rotate the handle 37 to move the core sections 29 and 30 to the position shown in Fig. 3 or to a position where the meeting surfaces thereof are in alignment with the meeting surfaces of the fastener sections 11 and 12, at which time the detents or plungers 32 and 43 will have engaged their respective notches 38 and 46 of the latching core sections 29 and 30, holding the latter in this position until the fastener sections 11 and 12 are again brought together.

From the foregoing it will be seen that a simple and inexpensive fastener is provided which consists of a housing defining a 360° track-way in which is rotatably confined a disc-like core, both housing and core being diametrically separated into two equal parts or sections so that when the sections of the core and housing are normal to each other, the housing sections may be separated but when the core is rotated 90° from this position, the housing sections are made inseparable by the core.

Manifestly, the construction as shown and described is capable of some modification and such modification as may be construed to fall within the scope and meaning of the appended claims is also considered to be within the spirit and intent of the invention.

What is claimed is:

1. A device for securing together relatively movable parts including a substantially flat housing formed in two complementary sections having meeting edges, each section consisting of a first plate and a second plate substantially coextensive with each other secured in juxtaposed, parallel relation with their meeting edges coinciding, the first plate having a semi-circular boss on one side thereof adjacent its meeting edge, the second plate having a semi-circular boss, of larger radius than the boss of the first plate, on the side thereof opposite the first plate, adjacent its meeting edge and arranged concentrically relative to the boss of the first plate, the meeting edge of the second plate having a semi-circular indentation therein of larger radius than the boss of the first plate and arranged concentrically relative thereto, the second plate having a semi-circular depression formed in the side thereof adjacent the first plate extending radially outwardly from the semi-circular indentation and defining a semi-circular flange coextensive with the semi-circular indentation and a semi-circular space between the semi-circular flange and the first plate, a disc formed in two complementary sections having meeting edges, each section having a central portion receivable within the semi-circular indentations of the second plates of the respective housing sections and a semi-circular peripheral flange receivable in the semi-circular spaces between the semi-circular flanges of the second plates and the first plates of the respective housing sections, the flanges of the disc sections frictionally engaging the peripheral surfaces of the juxtaposed bosses of the first plates of the respective housing sections when the housing sections are positioned in side by side relation to each other, one of the disc sections having a handle thereon whereby the disc may be rotated relative to the housing from a first position, in which the disc sections are each disposed wholly in one of the housing sections, to a second position in which the disc sections are each disposed partly in each of the housing sections.

2. The structure of claim 1, and means normally biasing the disc circumferentially toward a position relative to the housing in which the meeting edges of the disc sections are disposed at an angle to the meeting edges of the housing sections comprising a compression spring disposed in the semi-circular space between the flange of the second plate and the first plate of each of the housing sections, adjacent the periphery of the flange of one of the disc sections, and acting upon abutments carried by the housing section and the disc section, respectively, to bias the disc section circumferentially relative to the housing section.

3. The structure of claim 2, and means holding each of the disc sections against rotative displacement in one of the housing sections, when the housing sections are separated, comprising a plunger reciprocable in a bore formed in the boss of the first plate of each of the housing sections, perpendicular to its meeting edge, a compression spring received in a bore extending into the housing section and acting upon the inner end of the last mentioned bore and a first shoulder formed on the plunger to urge the plunger outwardly, a second shoulder formed on the plunger adapted to frictionally engage the periphery of the disc section, and a notch formed in the periphery of the disc section for engagement with the second shoulder.

4. The structure of claim 3, and means carried jointly by the respective housing sections cooperating to release the disc sections to the action of the biasing means, when the housing sections are brought operatively into juxtaposition, comprising a pin extending outwardly from each of the housing sections, perpendicular to its meeting edge, for engagement with the plunger of the opposite housing section to urge it inwardly against the action of the corresponding compression spring, to thereby disengage the second shoulder of the plunger from the periphery of the adjacent disc section.

References Cited in the file of this patent

UNITED STATES PATENTS

| 308,055 | Buck | Nov. 18, 1884 |
| 1,090,305 | Hoffman | Mar. 17, 1914 |
| 1,181,050 | Woodfine | Apr. 25, 1916 |
| 1,525,303 | Lanphere | Feb. 3, 1925 |
| 1,934,105 | Totty | Nov. 7, 1933 |